US011493995B2

(12) United States Patent
Sivakumar et al.

(10) Patent No.: US 11,493,995 B2
(45) Date of Patent: Nov. 8, 2022

(54) TACTILE USER INTERACTIONS FOR PERSONALIZED INTERACTIONS

(71) Applicant: International Business Machines Corporation, Armonk, NY (US)

(72) Inventors: Gandhi Sivakumar, Bentleigh (AU); Anil Manohar Omanwar, Vikas Nagar (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/210,649

(22) Filed: Mar. 24, 2021

(65) Prior Publication Data
US 2022/0308670 A1    Sep. 29, 2022

(51) Int. Cl.
*G06F 3/01* (2006.01)
*G06F 3/041* (2006.01)
*H01H 3/00* (2006.01)

(52) U.S. Cl.
CPC .............. *G06F 3/016* (2013.01); *G06F 3/011* (2013.01); *G06F 3/0416* (2013.01); *H01H 2003/008* (2013.01); *H01H 2215/052* (2013.01)

(58) Field of Classification Search
CPC ........ G06F 21/604; A63F 13/67; A63F 13/35; A63F 2300/535; G06N 7/005; G06N 20/00; G06Q 30/02; G06Q 10/04
See application file for complete search history.

(56) References Cited

U.S. PATENT DOCUMENTS

| 8,059,104 | B2 | | 11/2011 | Shahoian | |
|---|---|---|---|---|---|
| 8,447,144 | B2 | | 5/2013 | King | |
| 10,318,878 | B2 | * | 6/2019 | Hawkins | ................ G06N 7/005 |
| 10,482,376 | B1 | * | 11/2019 | Vaze | .................... G06N 3/0445 |
| 10,656,763 | B1 | * | 5/2020 | Moscovich | ........... G06F 3/0446 |
| 10,807,004 | B2 | * | 10/2020 | Aghdaie | ................. A63F 13/35 |
| 10,877,568 | B2 | * | 12/2020 | Huang | ................ G06N 3/0454 |
| 2008/0005067 | A1 | * | 1/2008 | Dumais | ............ G06F 16/24575 |
| 2010/0248822 | A1 | | 9/2010 | Migos | |
| 2011/0109548 | A1 | * | 5/2011 | Tu | ......................... A63F 13/211 345/158 |

(Continued)

FOREIGN PATENT DOCUMENTS

KR    20150118813 A    10/2015
WO    2016114926 A1    7/2016

OTHER PUBLICATIONS

Anonymous. "AI Platform for Business." Printed Mar. 23, 2021. 4 pages. Published by IBM. https://www.research.ibm.com/artificial-intelligence/ai-platform-for-business/.

(Continued)

*Primary Examiner* — William Lu
(74) *Attorney, Agent, or Firm* — Haley J. McClory

(57) ABSTRACT

A processor may identify that a user is interacting with a device, where the interacting is identified from the user touching the device. The processor may receive tactile data associated with the user from one or more tactile sensors. The processor may extract, utilizing an AI model, one or more features of the tactile data. The processor may classify, utilizing the AI model, the tactile data as having a tactile data characteristic. The processor may output the classification to an interaction management module.

15 Claims, 5 Drawing Sheets

(56) References Cited

U.S. PATENT DOCUMENTS

| | | | |
|---|---|---|---|
| 2012/0066163 A1* | 3/2012 | Balls | G06N 3/08 |
| | | | 435/6.12 |
| 2012/0222132 A1* | 8/2012 | Burger | G06F 21/604 |
| | | | 726/28 |
| 2013/0077775 A1 | 3/2013 | Fan | |
| 2014/0279050 A1 | 9/2014 | Makar | |
| 2014/0280890 A1* | 9/2014 | Yi | H04L 67/535 |
| | | | 709/224 |
| 2014/0300554 A1* | 10/2014 | Samuel | H04W 12/068 |
| | | | 345/173 |
| 2015/0235240 A1 | 8/2015 | Chang | |
| 2015/0271557 A1* | 9/2015 | Tabe | H04N 21/6125 |
| | | | 725/62 |
| 2016/0182719 A1* | 6/2016 | Skiba | H04M 3/5233 |
| | | | 379/265.05 |
| 2016/0300252 A1* | 10/2016 | Frank | G06F 16/24578 |
| 2016/0378861 A1* | 12/2016 | Eledath | G06T 19/006 |
| | | | 707/766 |
| 2017/0083096 A1 | 3/2017 | Rihn | |
| 2018/0097910 A1* | 4/2018 | D'Agostino | G06Q 20/1085 |
| 2018/0113996 A1* | 4/2018 | Cai | G06F 21/316 |
| 2018/0232662 A1* | 8/2018 | Solomon | G06F 3/017 |
| 2019/0038964 A1* | 2/2019 | Veeramani | A63F 13/67 |
| 2019/0042976 A1* | 2/2019 | Tanglertsampan | G06N 20/00 |
| 2019/0087707 A1* | 3/2019 | Cummins | G06N 5/04 |
| 2019/0103127 A1 | 4/2019 | Tseretopoulos | |
| 2019/0215440 A1* | 7/2019 | Rivard | G02B 27/28 |
| 2019/0268645 A1* | 8/2019 | Fuetsch | H04N 21/26603 |
| 2019/0332680 A1 | 10/2019 | Wang | |
| 2019/0388789 A1* | 12/2019 | Aghdaie | A63F 13/67 |
| 2020/0211035 A1* | 7/2020 | Bluming | G06Q 10/0635 |
| 2020/0241727 A1* | 7/2020 | Moscovich | G06F 3/04186 |
| 2020/0311347 A1* | 10/2020 | Theobald | G06K 9/6267 |
| 2021/0089040 A1* | 3/2021 | Ebrahimi Afrouzi | |
| | | | A47L 9/2894 |
| 2021/0097547 A1* | 4/2021 | Stockman | G06V 40/67 |
| 2021/0286429 A1* | 9/2021 | Azemi | G06F 3/015 |
| 2021/0342545 A1* | 11/2021 | Avshalomov | G06F 16/2457 |
| 2021/0350555 A1* | 11/2021 | Fischetti | G06V 20/52 |
| 2022/0108775 A1* | 4/2022 | Zweig | G16H 40/67 |

OTHER PUBLICATIONS

Anonymous. "Industry Solutions." Printed Sep. 25, 2020. 6 pages. Published by TACTAI. https://www.tactai.com/industry-solutions/.

Anonymous. "Tactile Feedback in Mobile: Consumer Attitudes About High-Definition Haptic Effects in Touch Screen Phones." Published Aug. 2017. 17 pages. Published by Immersion. https://www.immersion.com/wp-content/uploads/2017/08/tactile-feedback-in-mobile-consumer-attitudes-about.pdf.

Babu, et al., "Stable haptic feedback generation for mid-air gesture interactions: a hidden Markov model-based motion synthesis approach." Published Feb. 13, 2019. 17 pages. Published by Springer. https://robomechjournal.springeropen.com/articles/10.1186/s40648-019-0130-5.

Chinnock, C., "Are Haptics the Next Big Thing for Mobile Devices?" Published May 15, 2019. 7 pages. Published by Insight Media. https://www.insightmedia.info/are-haptics-the-next-big-thing-for-mobile-devices/.

Mell, et al., "The NIST Definition of Cloud Computing," Recommendations of the National Institute of Standards and Technology, U.S. Department of Commerce, Special Publication 800-145, Sep. 2011, 7 pgs.

Pattilachan, T., "How AI and Haptics Could Revolutionize VR Gaming." Published Sep. 23, 2019. 11 pages. Published by VR Scout, https://vrscout.com/news/how-ai-and-haptics-could-revolutionize-vr/.

* cited by examiner

TACTILE USER INTERACTIONS FOR PERSONALIZED INTERACTIONS

BACKGROUND

The present disclosure relates generally to the field of tactile user interactions, and more specifically to personalizing user experiences based on tactile user interactions with interfaces.

Interfaces with tactile sensors are used by many different types of devices that perform a variety of tasks. One example is virtual assistants that simulate human oriented tasks in business environments, social environments, or other types of environments.

SUMMARY

Embodiments of the present disclosure include a method, computer program product, and system for personalizing interactions for users based on tactile user interactions with interfaces.

A processor may identify that a user is interacting with a device, where the interacting is identified from the user touching the device. The processor may receive tactile data associated with the user from one or more tactile sensors. The processor may extract, utilizing an AI model, one or more features of the tactile data. The processor may classify, utilizing the AI model, the tactile data as having a tactile data characteristic. The processor may output the classification to an interaction management module.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
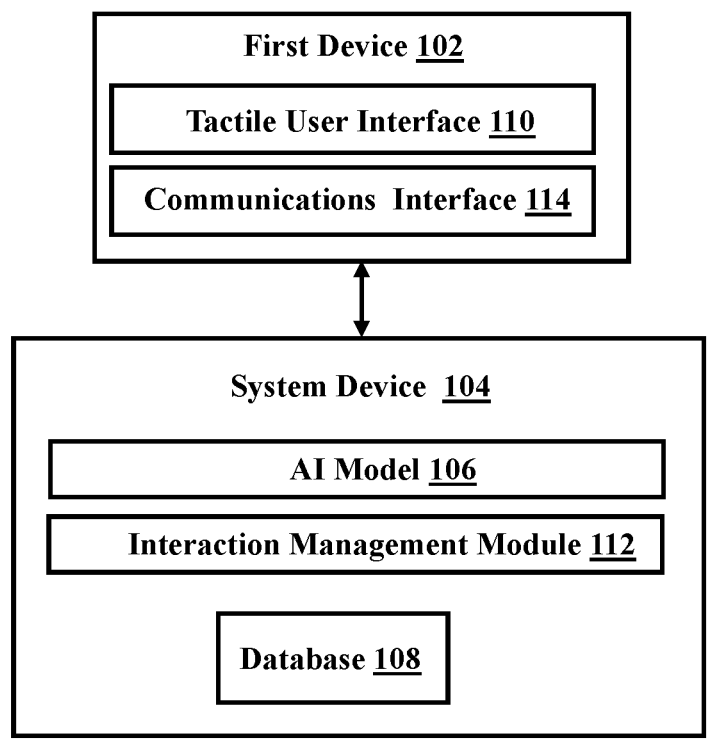
FIG. 1 is a block diagram of an exemplary system for personalizing interactions for users based on tactile user interactions, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tactile user interactions, and more specifically to personalizing interactions for users based on tactile user interactions with interfaces. While the present disclosure is not necessarily limited to such applications, various aspects of the disclosure may be appreciated through a discussion of various examples using this context.

In some embodiments, a processor may identify that a user is interacting with a device from the user touching the device. In some embodiments, the processor may receive tactile data associated with the user from one or more tactile sensors. In some embodiments, the device may be any computing device that has an interface with tactile sensors to detect the tactile interactions of a user with the interface. For example, the device may be a computing device, a laptop computer, a desktop computer, a tablet computer, a machine (e.g., ATM) interface, a wearable device, a gaming console, industrial equipment, a medical device, or automotive displays and controls. In some embodiments, the device may be a physical interface or a device having tactile sensory capabilities, and the device may be used by multiple users.

In some embodiments, the tactile sensors may detect the tactile interactions of the user with the device or device interface. In some embodiments, the tactile sensors may include piezoresistive, piezoelectric, capacitive, and elastoresistive sensors. In some embodiments, the tactile data may reflect the touch behavior or the patterns of use of a user handling or interacting with the device. In some embodiments, the tactile data may relate to how and where the user touched the device or interface, including the position of touch, pressure of touch, duration of touch, pressure during the duration of touch, the time between touches (e.g., tapping), the relative position of repeated touches, relative pressure of repeated touches, pattern of pressure of repeated touches, pattern of duration of touches, pattern of time between touches (e.g., a 0.2 second duration, followed by a 0.3 second duration, followed by a 0.1 duration), position of touch with respect to the device, position of touch with respect to the user interface, position of touch with respect to portions of the user interface (e.g., on the edge of a response button, in the center of a response button, etc.), touch patterns (e.g., low pressure touch followed by a high pressure touch held for 0.3 seconds), regions of interference (interaction area), area of engagement (e.g., 90% of touches were on the bottom ⅓ of the interface, 80% of touches were on the top ⅔ of the interface), etc.

In some embodiments, the tactile data may relate to at least one of a touch pattern, a touch pressure, and an area of engagement of touches of the user. In some embodiments, the touch pattern may relate to the pattern of pressure, position of touch, duration of touch, number of touches (e.g., taps, contacts, etc.), duration between touches, variations in the pressure during a touch or between multiple touches, variations in the position of touch (e.g., shaking), variations in the duration of touches, variations in the number of touches, variations in the duration between touches, and any combination thereof. For example, a touch pattern may relate to a user lightly tapping the bottom, right corner of an interface and then tapping a response button on the interface twice in the center of the response button.

In some embodiments, the touch pressure may be a measure of the pressure applied by a user to the interface when touching the interface. In some embodiments, the touch pressure may include a measure of the pressure being applied, the angle of the pressure, the area of the pressure, variation in duration of the pressure, etc. For example, a user may apply a light force for the first 0.05 seconds touching an interface, a medium force for the next 0.03 seconds, and a strong force for the remainder of the duration of the touch.

In some embodiments, the area of engagement may relate to locations on the interface or device that are touched. For example, a first user may only ever touch the center of a response button on a user interface, a second user may touch the user interface in more areas but only the bottom ⅓ of the interface, a third user may touch 80% of the interface, and a fourth user may have 90% of his touches in the area surrounding the response button on a user interface.

In some embodiments, the processor may extract, utilizing an AI model, one or more features of the tactile data. In some embodiments, the processor may classify the tactile data, utilizing the AI model, as having a tactile data characteristic. In some embodiments the AI model may use classification AI, neural networks, machine learning, or classification algorithms. In some embodiments, the one or more features of the tactile data may be features of the data that are used by the AI model to arrive at a classification of the tactile data as having a tactile data characteristic. For example, the one or more features of the tactile data may be feature vectors used by the classification AI to arrive at a classification. In some embodiments, the AI model may utilize serial or parallel stream-based classifiers that extract features from the tactile data.

In some embodiments, the tactile data characteristic may be the classification of the AI model that is output by the model. For example, based on the tactile data and the features of the tactile data, the AI model may output a tactile data characteristic that can determine if the user is an adult, child, or teenager (e.g., based on the area of the interface that the user touched, the pressure applied to the interface, etc.). In some embodiments, classifications may relate to the experience level of the user or a state of a user (e.g., that the user is in a rush, uncertain about the interactions the user is having with the device, certain about the interactions the user is having with the device, etc.). In some embodiments, the AI model may include a tag generator that includes a collection of tags and validity conditions for the tags. In some embodiments, the tag library may be loaded from a database and validity functions may be traversed to generate tags. In some embodiments, multi-level validation functions may be used to get the appropriate granulator tags to conditions.

In some embodiments, the processor may output the classification to an interaction management module. In some embodiments, the interaction management module may send commands to provide customized communications to users based on the classification output by the AI model. The interaction management module may use the classification to make determinations related to communications with a user. In some embodiments, the interaction management module may determine how to communicate with the user, the language to be used, how much to help the user, how to interact with the user, etc. For example, if the classification output by the processor is that the user is a child, the interaction management module may command that only games rated for children may be present as gaming options for the user. Later when another user uses the gaming console, based on a classification of the second user as an adult, the interaction management module may command that a different set of video games be presented to the adult player.

In some embodiments, the processor may determine, based on the classification, one or more interaction parameters for communications with the user. In some embodiments, the interaction parameters may relate to attributes of the communications that generate a more personalized response and deliver adaptive communication. In some embodiments, the interaction parameters may relate to language used by the system in communicating with the user. The interaction parameters may involve use of natural language processing for the communication. In some embodiments, the interaction parameters may include the language to be used, the tone to be used, choice of vocabulary (e.g., more sophisticated vocabulary, less sophisticated vocabulary), choice of syntax (simpler sentence structure, more complex sentence structure, more declarative sentences, more imperative sentences), a determination of how much to guide or help the user (e.g., provide more detailed instructions to the user regarding how to complete a task on the device), a determination of how to interact with the user (e.g., provide textual description of the steps needed to complete a task verses provide more images (such as screenshots) of the steps the user needs to take to complete a task), etc. In some embodiments, if the communication includes voice or audio outputs to the user, the interaction parameters may include the language, tone, and voice of the audio output. For example, the voice output for a child may include using the voice of a cartoon character.

For example, the interaction parameters may relate to a classification of users requiring very detailed explanations of the steps required to complete a task (e.g., each step broken down into sub-steps, images illustrating how to use the device interface at each step, etc.), another classification of users requiring medium detail, and third classification of users requiring even less detail. As another example, the interaction parameters for a child may include increasing the size of icons displayed.

In some embodiments, determining the one or more interaction parameters for communications with the user may include identifying, utilizing the interaction management module, that the classification is within a specified user interaction class. For example, the classifications of "adults," "experienced users," and "people in a hurry" may be grouped into the interaction class of "people requiring less detailed instructions." The interaction parameters for "people requiring less detailed instructions" may include: providing shorter instructions, providing less instructions, and not providing explanations for sub-steps that are reasonably well known to members of the interaction class. Additionally, the classifications of "children," "people who are not in a hurry," and "inexperienced users" may be grouped into the interaction class of "people requiring more detailed instructions." The interaction parameters for "people requiring more detailed instructions" may include: providing longer instructions, providing more instructions, providing explanations for sub-steps that are not reasonably well known to members of the interaction class, and providing additional communications to the user that welcomes the user to the interaction and encourages the user along the steps of the interaction.

In some embodiments, the processor may identify a first interaction parameter. In some embodiments, the processor may rank the first interaction parameter above a second interaction parameter. In some embodiments, the processor may display a first communication to the user based on an association of the first communication with the first interaction parameter. For example, the AI model may output two classifications for a user: "less experienced users" and "users who are in a hurry." The "less experienced users" may usually be associated with the interaction parameters for the class of "people requiring more detailed instructions," and the "users who are in a hurry" may usually be associated with the interaction parameters for the class of "people requiring less detailed instructions." The processor may rank the interaction parameter related to less detailed instructions above interaction parameters related to more detailed instructions, and the processor may provide a first communication to the user that has less detail.

In some embodiments, the one or more interaction parameters may include a priority for the communications with the user. In some embodiments, the interaction parameters may include parameters that customize the interaction or communication with the user based on an assessment of the amount of time the user may desire to interact with the device (e.g., based on a classification of the user as being in a hurry, etc.). For example, a classification of a user into a class of users in a hurry may result in interaction parameters such as: skip introduction and welcome, give less detailed instructions, and replace an explanation of the various features of the device with a prompt to the user to input an explanation of what the user would like to do with the device.

In some embodiments, the tactile data may include a stream of time-based tactile data, where the stream of time-based tactile data is a based on a set interval of time. In some embodiments, the processor may analyze the stream of time-based tactile data. In some embodiments, the processor may identify that the stream of time-based tactile data exceeds a particular classification threshold. For example, the tactile data may be tactile data obtained from a user's interaction with a tactile user interface over a ten second time period. The processor may analyze the position, area, pressure, and pattern of the user's touch during time increments over the ten second duration. The processor may identify that the area of the interface touched by the user during this time exceeds the classification threshold for classifying the user as a child, and a classification is output for the user.

Referring now to FIG. 1, a block diagram of a network 100 for personalizing interactions for users based on tactile user interactions is illustrated. Network 100 includes a first device 102 (e.g., a computing device, a laptop computer, a desktop computer, a tablet computer, a machine interface, a wearable device, a gaming console, industrial equipment, a medical device, or automotive displays and controls. etc.) and a system device 104. The first device 102 and the system device 104 are configured to be in communication with each other. The first device 102 and the system device 104 may be any devices that contain processors configured to perform one or more of the functions or steps described in this disclosure. System device 104 includes an AI model 106 and a database 108 for storing data associated with classification of tactile data as having a tactile data characteristic as well as tactile data obtained from the first device 102.

In some embodiments, a processor of the system device 104 identifies that a user is interactive with first device 102. The interaction is identified from tactile data obtained from a tactile user interface 110 on the first device 102. The system device 104 uses the AI model 106 to extract one or more features of the tactile data. The system device 104 also uses the AI model 106 to classify the tactile data as having a tactile data characteristic. The AI model 106 then outputs the classification to the interaction management module 112 of the system device 104.

In some embodiments, the interaction management module 112 may determine one or more interaction parameters for communications (e.g., via the communications interface 114) with the user based on the classification. In some embodiments, the interaction management module 112 may identify that the classification is within a specified user interaction class. In some embodiments, the one or more interaction parameters may include a priority for the communications with the user. In some embodiments, the interaction management module 112 may identify a first interaction parameter and rank the first interaction parameter above a second interaction parameter. In some embodiments the interaction management module 112 may command the communications interface 114 of the first device 102 to display a first communication to the user based on an association of the first communication with the first interaction parameter.

In some embodiments, the tactile data may relate to a touch pattern of the touch of a user on the tactile user interface 110. In some embodiments, the tactile data may relate to the pressure of a touch from the user on the tactile user interface 110. In some embodiments, the tactile data may relate to the area of engagement of the user on the tactile user interface 110. In some embodiments, the tactile data may include a stream of time-based tactile data, where the stream of time-based tactile data is a based on a set interval of time. The AI model 106 may analyze the stream of time-based tactile data and identify that the stream of time-based tactile data exceeds a particular classification threshold.

Figure 2:
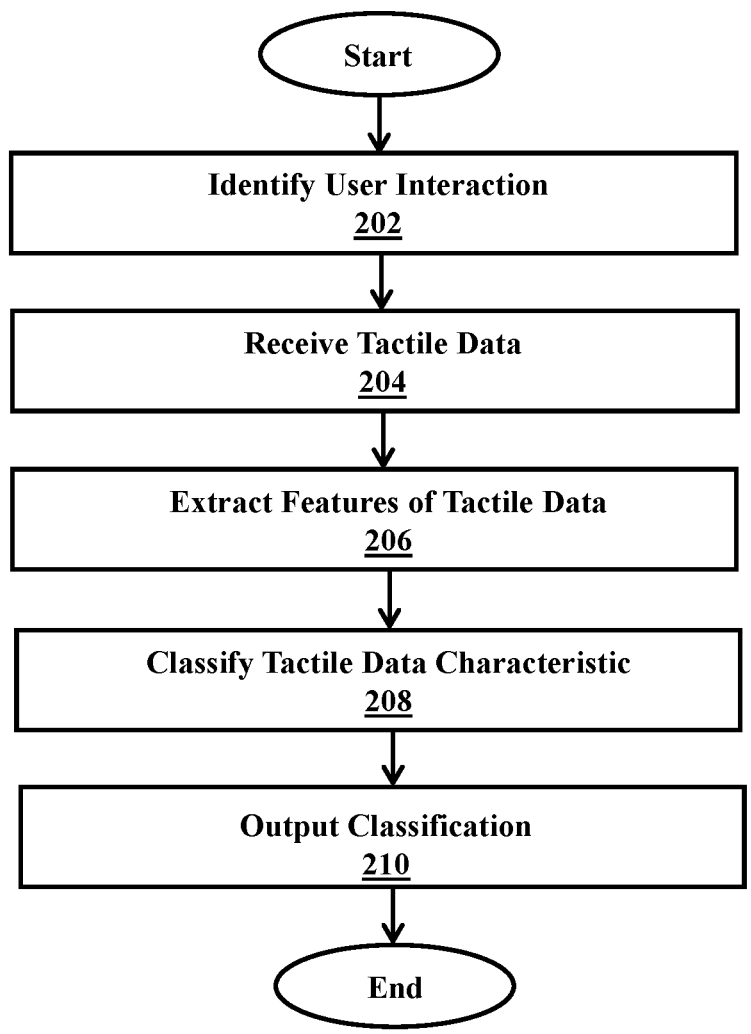
FIG. 2 is a flowchart of an exemplary method for personalizing interactions for users based on tactile user interactions, in accordance with aspects of the present disclosure.

Referring now to FIG. 2, illustrated is a flowchart of an exemplary method 200 for personalizing interactions for users based on tactile user interactions, in accordance with embodiments of the present disclosure. In some embodiments, a processor of a system may perform the operations of the method 200. In some embodiments, method 200 begins at operation 202. At operation 202, the processor identifies that a user is interacting with a device. In some embodiments, method 200 proceeds to operation 204, where the processor receives tactile data associated with the user from one or more tactile sensors. In some embodiments, method 200 proceeds to operation 206. At operation 206, the processor extracts one or more features of the tactile data. In some embodiments, method 200 proceeds to operation 208. At operation 208, the processor classifies the tactile data as having a tactile data characteristic. In some embodiments, method 200 proceeds to operation 210. At operation 210, the processor outputs the classification to an interaction management module.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
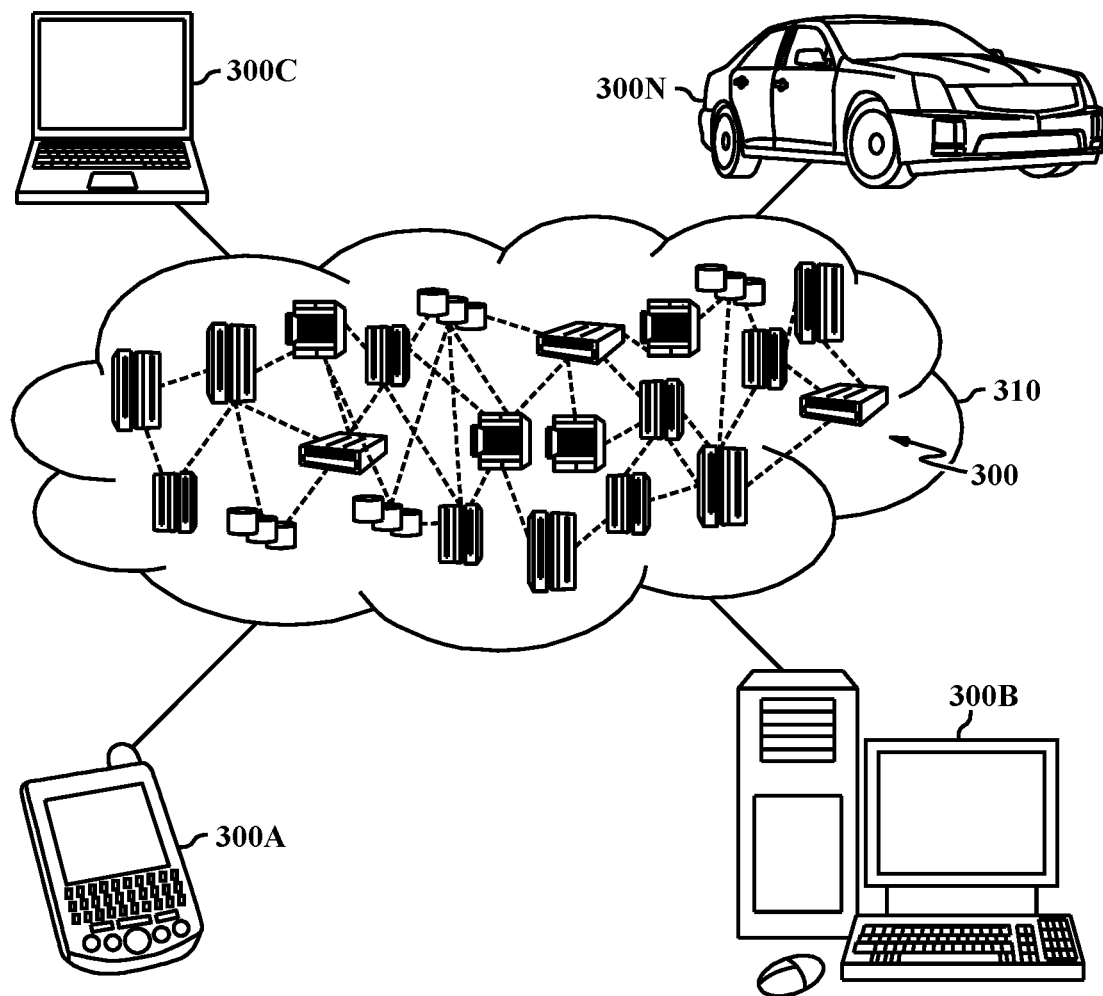
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
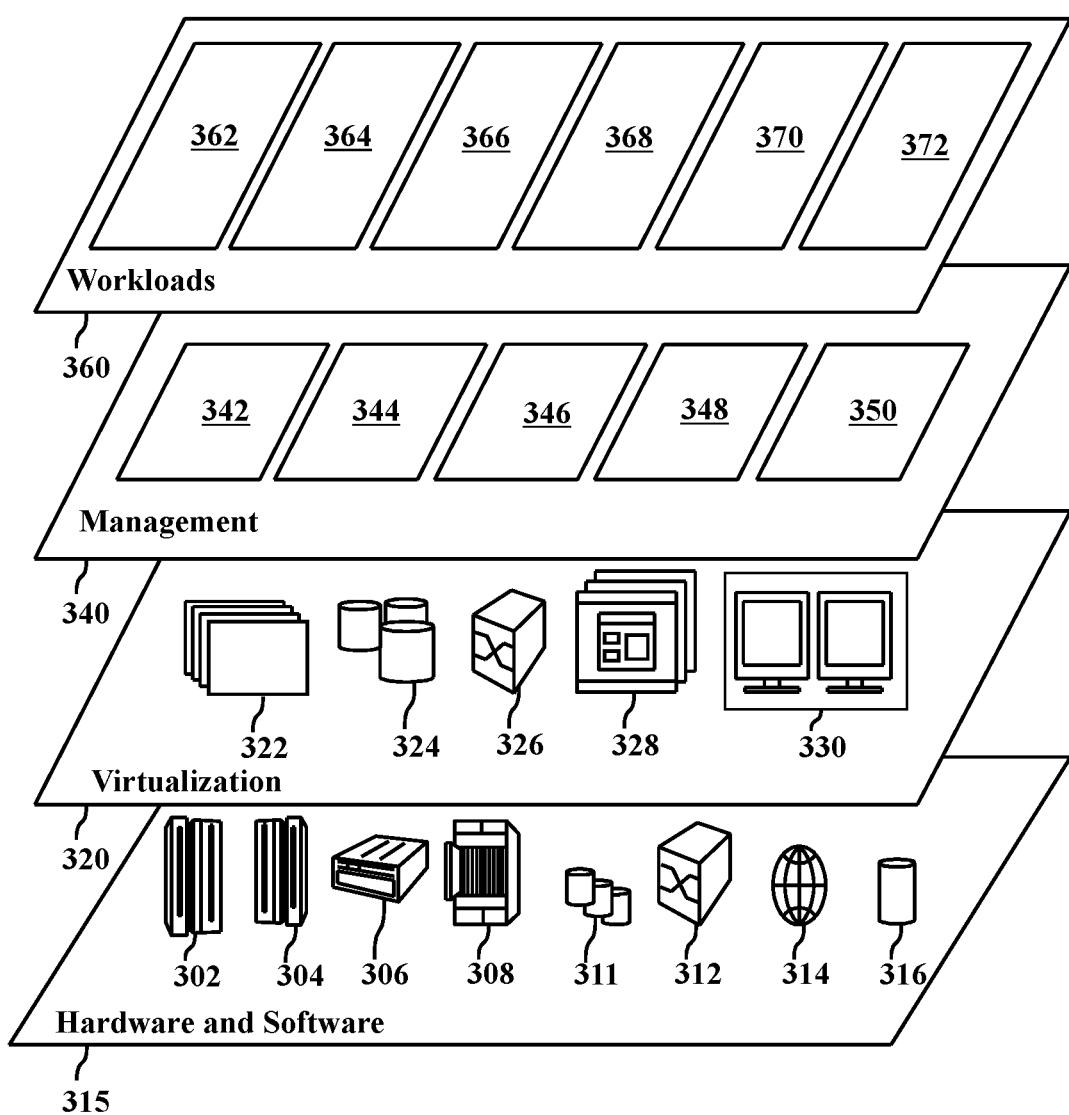
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and personalizing interactions for users based on tactile user interactions with interfaces 372.

Figure 4:
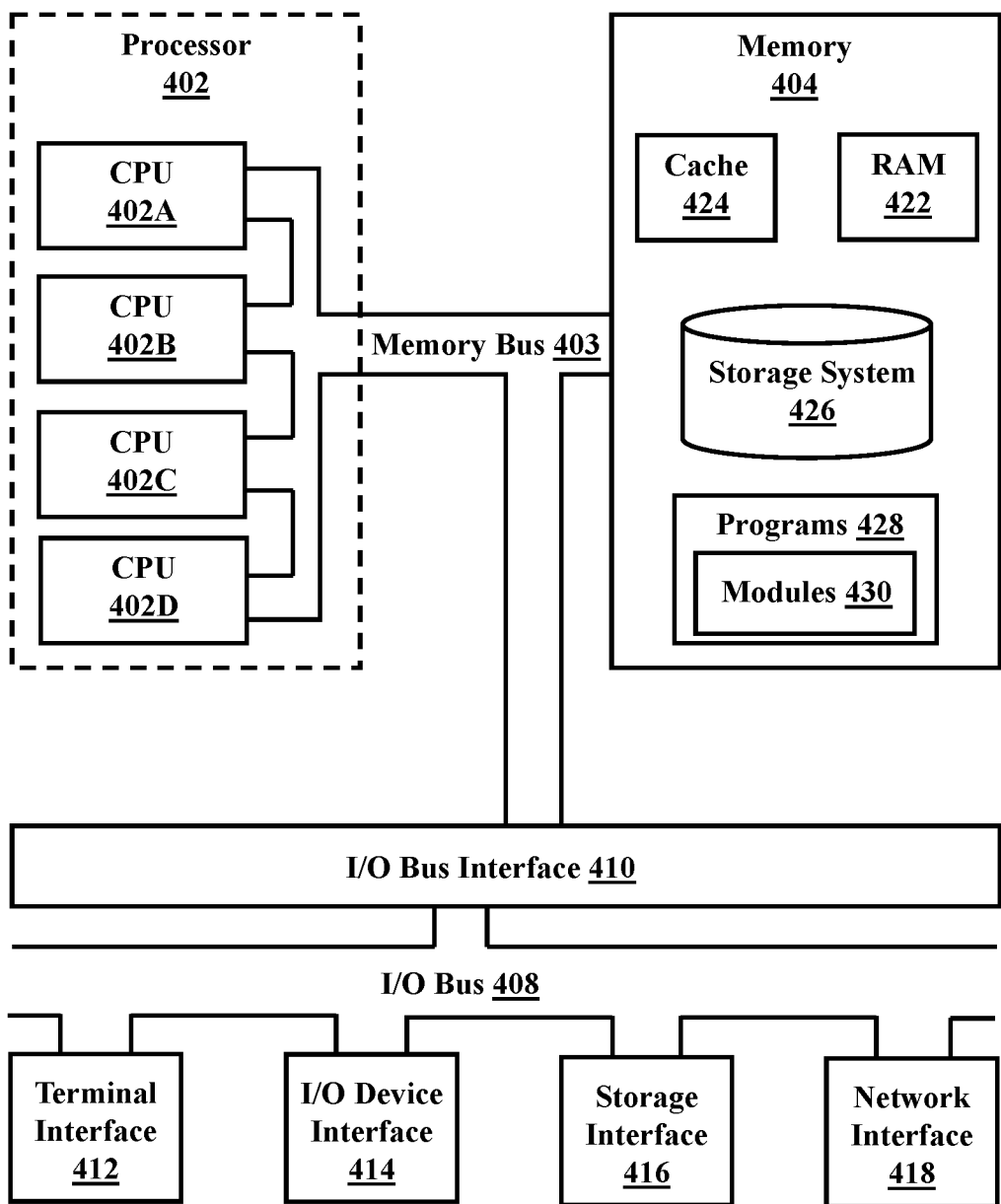
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   identifying, by a processor, that a user is interacting with a device, wherein the interacting is identified from the user touching the device;
   receiving tactile data associated with the user from one or more tactile sensors;
   extracting, utilizing an AI model, one or more features of the tactile data;
   classifying, utilizing the AI model, the tactile data as having a tactile data characteristic;
   determining, based on the classification, one or more interaction parameters for one or more communications with the user, wherein the one or more interaction parameters include a priority for the one or more communications with the user, and wherein the priority is based on a ranking of the interaction parameters; and
   outputting the classification to an interaction management module, wherein the interaction management module provides the one or more communications to the user based on the classification.

2. The method of claim 1, wherein determining the one or more interaction parameters for the one or more communications with the user includes:
   identifying, utilizing the interaction management module, that the classification is within a specified user interaction class.

3. The method of claim 1, further comprising:
   identifying a first interaction parameter;
   ranking the first interaction parameter above a second interaction parameter; and
   displaying a first communication to the user based on an association of the first communication with the first interaction parameter.

4. The method of claim 1, wherein the tactile data relates to at least one of a touch pattern, a touch pressure, and an area of engagement of touches of the user.

5. The method of claim 1, wherein the tactile data includes a stream of time-based tactile data, wherein the stream of time-based tactile data is a based on a set interval of time, and wherein the method further comprises:
   analyzing the stream of time-based tactile data; and
   identifying that the stream of time-based tactile data exceeds a particular classification threshold.

6. A system comprising:
   a memory; and
   a processor in communication with the memory, the processor being configured to perform operations comprising:
      identifying that a user is interacting with a device, wherein the interacting is identified from the user touching the device;
      receiving tactile data associated with the user from one or more tactile sensors;
      extracting, utilizing an AI model, one or more features of the tactile data;
      classifying, utilizing the AI model, the tactile data as having a tactile data characteristic;
      determining, based on the classification, one or more interaction parameters for one or more communications with the user, wherein the one or more interaction parameters include a priority for the one or more communications with the user, and wherein the priority is based on a ranking of the interaction parameters; and
      outputting the classification to an interaction management module, wherein the interaction management module provides the one or more communications to the user based on the classification.

7. The system of claim 6, wherein determining the one or more interaction parameters for the one or more communications with the user includes:
   identifying, utilizing the interaction management module, that the classification is within a specified user interaction class.

8. The system of claim 6, the processor being further configured to perform operations comprising:
   identifying a first interaction parameter;
   ranking the first interaction parameter above a second interaction parameter; and
   displaying a first communication to the user based on an association of the first communication with the first interaction parameter.

9. The system of claim 6, wherein the tactile data relates to at least one of a touch pattern, a touch pressure, and an area of engagement of touches of the user.

10. The system of claim 6, wherein the tactile data includes a stream of time-based tactile data, wherein the stream of time-based tactile data is a based on a set interval of time, and wherein the processor is further configured to perform operations comprising:
    analyzing the stream of time-based tactile data; and
    identifying that the stream of time-based tactile data exceeds a particular classification threshold.

11. A computer program product comprising a computer readable storage medium having program instructions embodied therewith, the program instructions executable by a processor to cause the processor to perform operations, the operations comprising:
    identifying that a user is interacting with a device, wherein the interacting is identified from the user touching the device;
    receiving tactile data associated with the user from one or more tactile sensors;
    extracting, utilizing an AI model, one or more features of the tactile data;
    classifying, utilizing the AI model, the tactile data as having a tactile data characteristic;
    determining, based on the classification, one or more interaction parameters for one or more communications with the user, wherein the one or more interaction parameters include a priority for the one or more communications with the user, and wherein the priority is based on a ranking of the interaction parameters; and
    outputting the classification to an interaction management module, wherein the interaction management module provides the one or more communications to the user based on the classification.

12. The computer program product of claim 11, wherein determining the one or more interaction parameters for the one or more communications with the user includes:
    identifying, utilizing the interaction management module, that the classification is within a specified user interaction class.

13. The computer program product of claim 11, the processor being further configured to perform operations comprising:
    identifying a first interaction parameter;
    ranking the first interaction parameter above a second interaction parameter; and displaying a first communication to the user based on an association of the first communication with the first interaction parameter.

14. The computer program product of claim 11, wherein the tactile data relates to at least one of a touch pattern, a touch pressure, and an area of engagement of touches of the user.

15. The method of claim 1, further comprising:
assessing an amount of time the user interacts with the device; and
customizing the one or more communications with the user based on the amount of time the user interacts with the device.

* * * * *